(12) United States Patent
Moiseenko et al.

(10) Patent No.: US 9,684,441 B2
(45) Date of Patent: Jun. 20, 2017

(54) APPARATUS AND ASSOCIATED METHODS

(71) Applicant: Nokia Technologies Oy, Espoo (FI)

(72) Inventors: Andrey Moiseenko, Espoo (FI); Shahil Soni, Espoo (FI); Annina Koskinen, Espoo (FI); Jukka Petteri Miettinen, Nummenkyla (FI); Ari Liusaari, Helsinki (FI); Mikko Anttilainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 145 days.

(21) Appl. No.: 13/657,314

(22) Filed: Oct. 22, 2012

(65) Prior Publication Data
US 2014/0115478 A1 Apr. 24, 2014

(51) Int. Cl.
*G06F 3/01* (2006.01)
*G06F 3/0485* (2013.01)
*G11B 27/34* (2006.01)
*G11B 27/10* (2006.01)

(52) U.S. Cl.
CPC ........ *G06F 3/04855* (2013.01); *G11B 27/105* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 6,414,686 B1 | 7/2002 | Protheroe et al. | |
| 2008/0220747 A1* | 9/2008 | Ashkenazi | G06Q 30/02 455/414.1 |
| 2009/0240710 A1 | 9/2009 | Bilman et al. | |
| 2010/0235746 A1* | 9/2010 | Anzures | 715/723 |
| 2013/0055083 A1* | 2/2013 | Fino | G06F 3/0485 715/716 |
| 2013/0124990 A1* | 5/2013 | Lettau | 715/716 |
| 2013/0129308 A1* | 5/2013 | Karn et al. | 386/230 |

OTHER PUBLICATIONS

"*Ringtone* Maker;" Bing Bang INC.; Google Play; retrieved on Nov. 15, 2012 from <https://play.google.com/store/apps/details?id=com.herman.ringtone&hl=en>.

"*MP3 Ringtone* Maker;" Lucky Star; Google Play; retrieved on Nov. 15, 2012 from <https://play.google.com/store/apps/details?id=net.lucky.star.mrtm&feature=search_result#?t=W251bGwsMSwxLDEsIm51dC5sdWNreS5zdGFyLmlydG0iXQ>.

(Continued)

*Primary Examiner* — Tuan S Nguyen
(74) *Attorney, Agent, or Firm* — Alston & Bird LLP

(57) ABSTRACT

An apparatus comprising at least one processor and at least one memory including computer program code, the at least one memory and the computer program code configured to, with the at least one processor, cause the apparatus to perform at least the following: display a partial portion of a media scroll-line on a display; allow user marking input of respective start and end points to the partial portion of the media scroll-line, the marked start point and end point together defining a selection segment of the partial portion; and allow user scrolling input to the media scroll-line itself to scroll the media scroll-line on the display relative to the selection segment to re-position the selection segment to a different partial portion of the media scroll-line to allow for selection of the re-positioned selection segment.

20 Claims, 7 Drawing Sheets

(56) References Cited

OTHER PUBLICATIONS 3G et al.; "*Nokia N8 12 Megapixel Camera and Editing Close Up*;" YouTube; dated Feb. 1, 2012; retrieved on Jan. 16, 2014 from <http://www.youtube.com/watch?v=J0rkj1vqhYg>.
*Know You Mobile;* "*How to edit photos on the Nokia N8*;" YouTube; dated Aug. 19, 2010; retrieved on Jan. 17, 2014 from <http://www.youtube.com/watch?v=NbbBk0rFnjk>.
International Search Report and Written Opinion for Application No. PCT/FI2012/050922; dated Jan. 31, 2014.

* cited by examiner

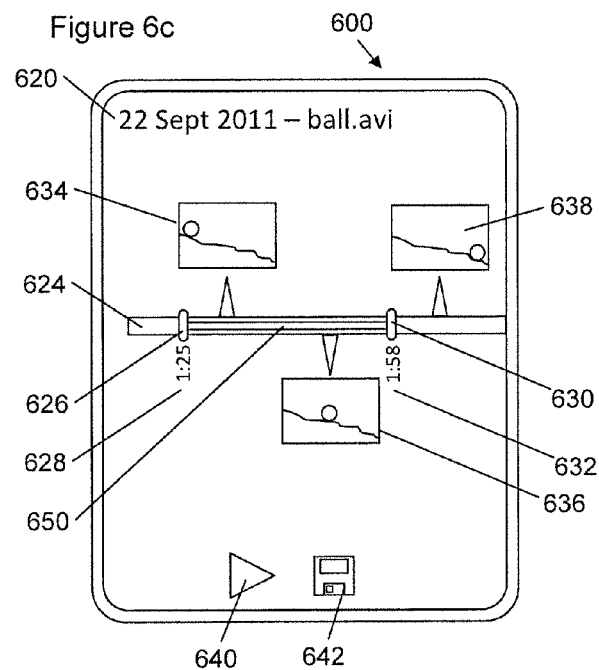
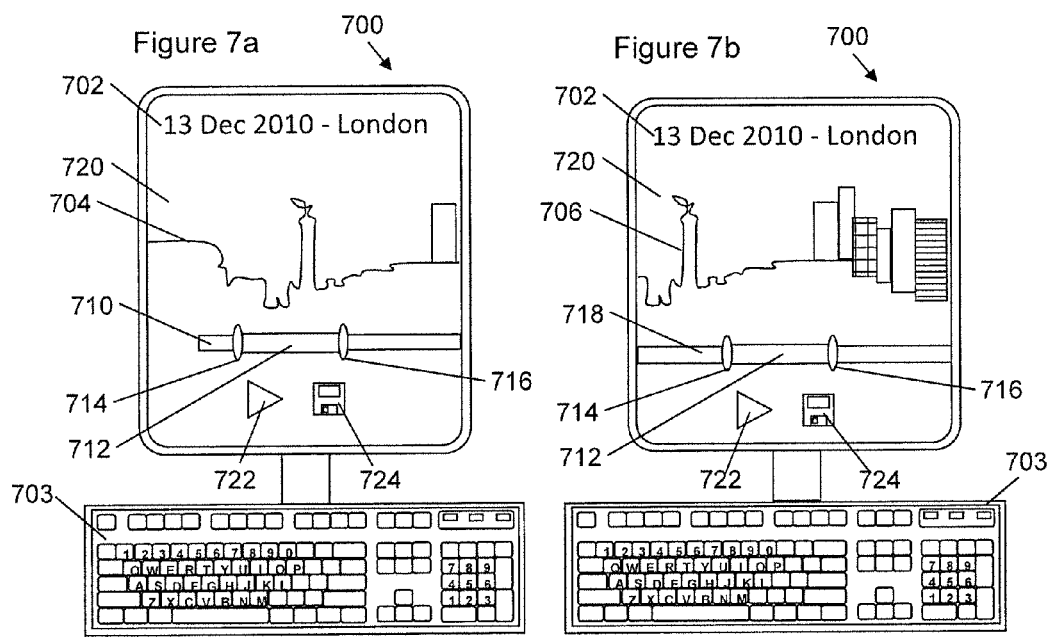

Figure 8a
Figure 8b
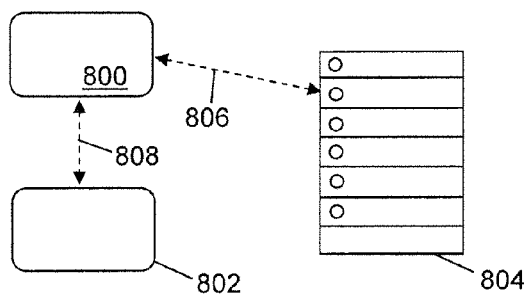
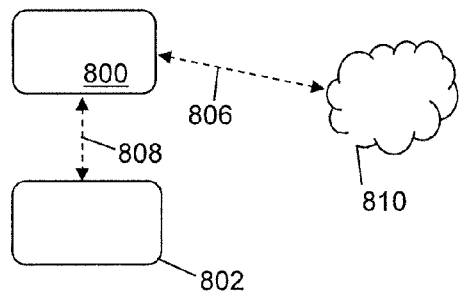
Figure 9
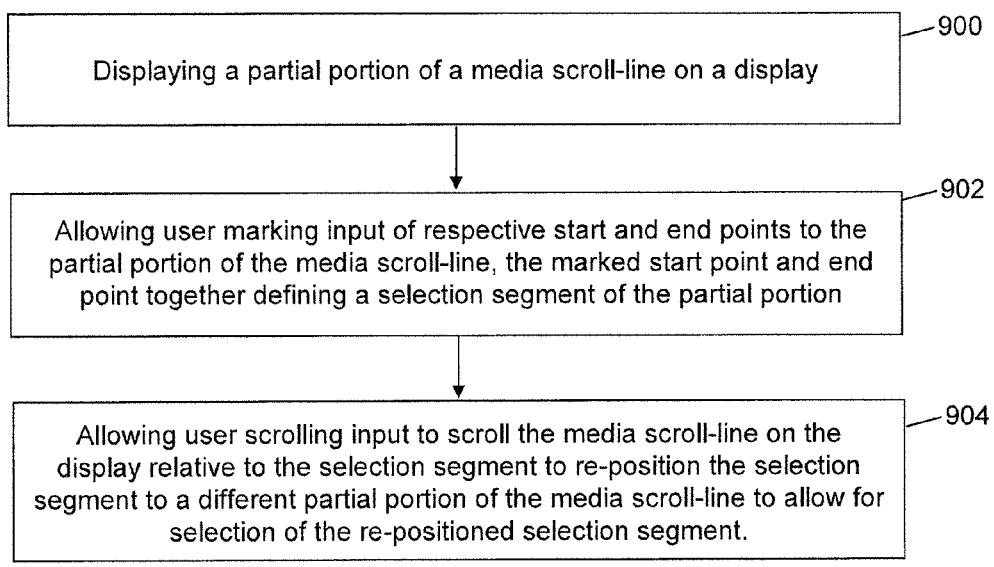
Figure 10
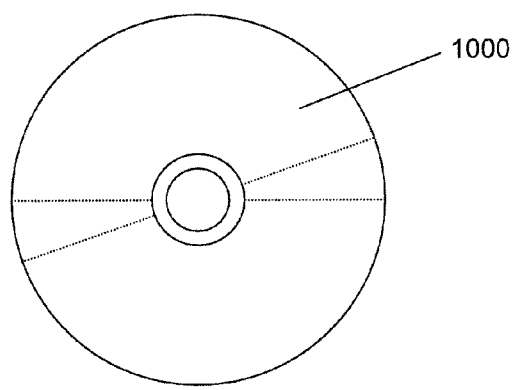

APPARATUS AND ASSOCIATED METHODS

TECHNICAL FIELD

The present disclosure relates to the field of user interfaces, associated methods, computer programs and apparatus. Certain disclosed aspects/examples relate to portable electronic devices, in particular, hand-portable electronic devices, which may be hand-held in use (although they may be placed in a cradle in use). Such hand-portable electronic devices include Personal Digital Assistants (PDAs), mobile telephones, smartphones and other smart devices, and tablet PCs.

Portable electronic devices/apparatus according to one or more disclosed aspects/examples may provide one or more: audio/text/video communication functions such as tele-communication, video-communication, and/or text transmission (Short Message Service (SMS)/Multimedia Message Service (MMS)/emailing functions); interactive/non-interactive viewing functions (such as web-browsing, navigation, TV/program viewing functions); music recording/playing functions such as MP3 or other format, FM/AM radio broadcast recording/playing; downloading/sending of data functions; image capture functions (for example, using a digital camera); and gaming functions.

BACKGROUND

Modern electronic devices can allow a user to record, listen and/or view audio and/or video content on the device. For example, a user may watch a pop-music video on a smartphone, watch a movie on a tablet computer, or listen to a song on an audio player. It may be possible for a user to edit the audio and/or video content using the device, for example to select a clip of the audio/video content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect there is provided an apparatus comprising at least one processor; and at least one memory including computer program code, the at least one memory and the computer program code configured to, with the at least one processor, cause the apparatus to perform at least the following:
  display a partial portion of a media scroll-line on a display;
  allow user marking input of respective start and end points to the partial portion of the media scroll-line, the marked start point and end point together defining a selection segment of the partial portion; and
  allow user scrolling input to scroll the media scroll-line on the display relative to the selection segment to re-position the selection segment to a different partial portion of the media scroll-line to allow for selection of the re-positioned selection segment.

The apparatus may be configured such that the user scrolling input to the media scroll-line is to the media scroll-line itself or to a background of the media scroll-line, the user scrolling input allowing for scrolling of the media scroll-line on the display relative to the selection segment, to re-position the selection segment to a different partial portion of the media scroll-line, to allow for selection of the re-positioned selection segment.

Thus the user may make a scroll user input to the media scroll-line, for example by touching and dragging the media scroll-line, or by clicking and dragging the media scroll-line with a mouse pointer, in order to scroll the media scroll-line across the screen. In other examples the user may scroll the media scroll-line by interacting with a displayed background image. In this example it may be that the device recognises any user scroll input (such as a touch and drag, swipe or flick gesture on a touch sensitive screen) in the background area of the display as a user input to scroll the media scroll line across the screen.

The apparatus may be configured such that the media scroll-line is a media timeline, the media timeline for use in controlling the playing of the media content associated with the media timeline.

The apparatus may be configured such that the position of the selection segment on the display remains fixed relative to the display whilst the user scrolling input scrolls the media scroll-line on the display.

The selection segment may represent one or more of a particular time duration or a subset of the content of the media associated with the media scroll-line.

The apparatus may be configured such that, while one of the marked start or end points of the selection segment does not reach an edge of the display, the position of the selection segment on the display moves whilst the user scrolling input scrolls the media scroll-line on the display. When one of the marked start or end points of the selection segment does reach an edge of the display due to the user scrolling input, the media scroll-line may continue to scroll on the display relative to the selection segment to re-position the selection segment to a different partial portion of the media scroll-line for the duration of the user scrolling input.

The apparatus may be configured such that the position of the selection segment on the display remains fixed relative to the display whilst the user scrolling input scrolls the media scroll-line and a displayed background image on the display.

The apparatus may be configured such that user marking input of respective start and end points on the media scroll-line and the user scrolling input to scroll the media scroll-line on the display relative to the selection segment are performed at the same display zoom level.

The apparatus may be configured such that the segment of media content associated with the selection segment is small compared to the media content or partial portion of the media content, such that it requires a refined level of manipulation resolution to allow for accurate user selection which would not available if the media scroll-line representing the whole media content was provided on the display. In such a case, the level of zoom, for a given display, associated with displaying a partial portion is sufficient to allow for an accurate level of manipulation of the start and end points to allow a user to select the required segment size.

The partial portion may represent up to one of substantially 95%, 90%, 85%, 80%, 75%, 70%, 65%, 60%, 55%, 50%, 45%, 40%, 35%, 30%, 25%, 20%, 15%, 10%, 5%, or 1% of the duration of the whole of the media content.

The selection segment may represent up to one of substantially 95%, 90%, 85%, 80%, 75%, 70%, 65%, 60%, 55%, 50%, 45%, 40%, 35%, 30%, 25%, 20%, 15%, 10%, 5%, or 1% of the duration of the partial portion or the duration of the whole of the media content.

The apparatus may be configured such that the media scroll-line is up to one of substantially 11, 10.5, 10, 9.5, 9, 8.5, 8, 7.5, 7, 6.5, 6, 5.5, 5, 4.5, 4, 3.5, 3, 2.5, 2, 1.5, or 1 inches in length.

The apparatus may be configured such that the dimension of the display along the axis of the media scroll-line is up to one of substantially 12, 11.5, 11, 10.5, 10, 9.5, 9, 8.5, 8, 7.5, 7, 6.5, 6, 5.5, 5, 4.5, 4, 3.5, 3, 2.5, 2, 1.5, or 1 inches in length.

The apparatus may be configured such that the start and end points of the selection segment are up to one of substantially 11, 10.5, 10, 9.5, 9, 8.5, 8, 7.5, 7, 6.5, 6, 5.5, 5, 4.5, 4, 3.5, 3, 2.5, 2, 1.5, or 1 inches in length apart.

The present disclosure positively encompasses all combinations of the aforementioned dimensions and percentages without specific exhaustive and separate listing thereof of all combinations.

The apparatus may be configured to allow storage of the media content associated with the selection segment as a new media file. The new media file may be useable as one or more of: a ringtone, an audio clip, or a movie clip.

The apparatus may be configured to allow playback of the media content associated with the selection segment prior to storing the media content associated with the selection segment as a new media file.

The apparatus may be configured such that the size of the selection segment which can be selected is controlled (for example, by the apparatus) to be associated with a (e.g., a maximum or minimum) size of an associated media file, such that the size of the new media file which would be created/used is of a size which can be used to perform a function using a particular device. This function may be, for example, playing a selected segment of a song as a ringtone, attaching a segment of a movie to an MMS message, or uploading a segment of a movie to a website, for example. In such cases, it will be appreciated that some electronic devices limit the size of a (media) file which can be used as a ringtone, or transmitted to a website, or elsewhere (e.g., as an MMS message). For example, the maximum size of a file to be used as a ringtone may be, for example, 30 seconds long, or 1 Mb in file size. The apparatus may automatically limit a selection segment size to a maximum predetermined size dependent on what type of associated media file (e.g., ringtone, screensaver, MMS attachment) the selection segment will be used for.

The apparatus may be configured such that one of the start and end points of the different partial portion is positioned to be within, on, or adjacent to the position of the start and end points of the selection segment prior to user scrolling. Thus the re-positioned selection segment may partially overlap the position of the selection segment prior to user scrolling. For example, a selection segment having a start marker at 10 seconds and an end marker at 30 seconds may be moved along a media scroll-line by the user scrolling the media scroll-line so the start marker is repositioned at 20 seconds and the end marker is repositioned at 40 seconds. The user has performed a scroll user input to effectively move the media scroll-line by an amount equivalent to 10 seconds of media content. The re-positioned selection segment partially overlaps the position of the selection segment prior to user scrolling in this example.

The apparatus may be configured such that the re-positioned selection segment is not associated with the particular time segment of the media content as marked by the position of the start and end points of the selection segment prior to user scrolling. For example, a selection segment having a start marker at 10 seconds and an end marker at 30 seconds may be moved along a media scroll-line by the user scrolling the media scroll-line so the start marker is repositioned at 50 seconds and the end marker is repositioned to 70 seconds. has performed a scroll user input to effectively move the media scroll-line by an amount equivalent to 40 seconds of media content. The re-positioned selection segment is not associated with the particular time segment as marked prior to user scrolling.

The apparatus may be configured such that the media scroll-line is configured to control the playing of the media content. For example, the media scroll-line may be used to control playing the associated media content by allowing for user input to one or more of the media scroll-line itself and to a background of the media scroll-line to perform one or more of: scroll through, play, pause, cut out and paste to the media content.

The apparatus may be configured such that if the media, associated with the media scroll-line, is being played/outputted, a user scrolling input may be made (to the media scroll-line or to the background) to scroll the media scroll-line. In such a case, the movement of the start marker with respect to the media scroll-line may cause the media being played/outputted to re-start playing/being output from the new position of the start marker with respect to the media scroll-line. Similarly, a user input may be made to move the start (or end) marker while the media associated with the media scroll-line is playing/being output. The movement of the start marker with respect to the media scroll-line may therefore cause the media being played/outputted to re-start playing from the new position of the start marker with respect to the media scroll-line.

The apparatus may be configured such that the start point and end point on the media scroll-line are re-positionable by the user with respect to the media scroll-line to vary the size of the selection segment by user interaction with the respective marked start and end points. The media content associated with the media scroll-line may comprise audio and/or video media content. The media content may be associated with one of a single discrete media file or a plurality of discrete media files. The media content may be associated with a single movie, a single audio track, a single audio album, a single video album, or a compilation for a plurality of discrete single images/movies/audio tracks. For example, a compilation may be a series of media files categorised in the same way, such as "comedy" movie files, "rock music" songs/audio tracks, "Sherlock Holmes" audio books, "holiday" photographs and movies, or "John's" audio tracks (excluding audio tracks of other users of a device).

The apparatus may be configured to receive the user marking and user scrolling input using one or more of: touch input on the display and input made via a peripheral device (for example, a mouse, trackpad or trackball).

The apparatus may be: a portable electronic device, the display, the display of a portable electronic device, the display of a desktop computer, a desktop computer, a mobile telephone, a smartphone, a tablet computer, an audio player, a video player, a television, a user interface or a module for the same. A portable electronic device may be: a mobile telephone, a smartphone, an audio player, a tablet computer, or a video player.

The apparatus may be configured to represent the partial portion of the media scroll-line using one or more of:
  a bar,
  a waveform representative of the associated audio or
    video media file; and
  a series of screenshots representative of a video media
    file.

The start point and end point on the media scroll-line may each have an associated time indicator showing the time difference between the start of the media scroll-line and each respective start and end point time indicator.

The media scroll-line may include one or more time indicators showing the time difference between the start of the media scroll-line and each respective time indicator, or may include one or more non-time related delineations, for example indicating a number of discrete media files such as photographs.

In a further aspect there is provided computer program code configured to:
 display a partial portion of a media scroll-line on a display;
 allow user marking input of respective start and end points to the partial portion of the media scroll-line, the marked start point and end point together defining a selection segment of the partial portion; and
 allow user scrolling input to scroll the media scroll-line on the display relative to the selection segment to re-position the selection segment to a different partial portion of the media scroll-line to allow for selection of the re-positioned selection segment.

In a further aspect there is provided a computer readable medium comprising computer program code stored thereon, the computer readable medium and computer program code being configured to, when run on at least one processor, perform at least the following:
 display a partial portion of a media scroll-line on a display;
 allow user marking input of respective start and end points to the partial portion of the media scroll-line, the marked start point and end point together defining a selection segment of the partial portion; and
 allow user scrolling input to scroll the media scroll-line on the display relative to the selection segment to re-position the selection segment to a different partial portion of the media scroll-line to allow for selection of the re-positioned selection segment.

In a further aspect there is provided a method, the method comprising:
 displaying a partial portion of a media scroll-line on a display;
 allowing user marking input of respective start and end points to the partial portion of the media scroll-line, the marked start point and end point together defining a selection segment of the partial portion; and
 allowing user scrolling input to scroll the media scroll-line on the display relative to the selection segment to re-position the selection segment to a different partial portion of the media scroll-line to allow for selection of the re-positioned selection segment.

In a further aspect there is provided an apparatus, the apparatus comprising:
 means for displaying a partial portion of a media scroll-line on a display;
 means for allowing user marking input of respective start and end points to the partial portion of the media scroll-line, the marked start point and end point together defining a selection segment of the partial portion; and
 means for allowing user scrolling input to scroll the media scroll-line on the display relative to the selection segment to re-position the selection segment to a different partial portion of the media scroll-line to allow for selection of the re-positioned selection segment.

The present disclosure includes one or more corresponding aspects, examples or features in isolation or in various combinations whether or not specifically stated (including claimed) in that combination or in isolation. Corresponding means and corresponding functional units (e.g., touch-screen display, user input sensors for scrolling and selection) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIGS. 6a-6c illustrate different representations of a media scroll-line;

FIGS. 7a-7b illustrate scrolling the media scroll-line and background on the display of a desktop computer;

FIGS. 8a and 8b illustrate the apparatus in communication with a remote server or cloud;

FIG. 9 illustrates a method according to the present disclosure; and

FIG. 10 illustrates a computer readable medium comprising computer program code according to the present disclosure.

DESCRIPTION OF EXAMPLE ASPECTS

Modern electronic devices can allow a user to record, listen and/or view audio/video content on the device. For example, a user may watch and listen to a pop-music video using a smartphone, watch a movie on a tablet or desktop computer, or listen to a song on an audio player. It may be possible for a user to edit the audio and/or video content using the device, for example to select a clip of the audio/video content.

Performing the selection of a segment of an audio/video file on a portable electronic device can be troublesome. For example, a user may wish to select a part/segment of a song and record that part for use as a ringtone. Having a limited screen size, such as that of a smartphone (compared with a larger 19 inch monitor of a desktop computer), for example, can make it difficult for a user to select a part of a song easily. Also, having a limited segment size, to effectively represent the full content (e.g., of a large media file such as a feature length movie, or multiple media files) whilst allowing for ready selection of a segment of this content can be challenging.

The following embodiments discuss examples of a media scroll-line which is a media timeline; that is, the scroll-line represents the time duration into a particular item of media (audio and/or video). Thus the media scroll-line may, for example, represent a song 4 minutes 22 seconds long and positions along the media scroll-line may represent times into the song, such as 10 seconds into the song, 1 minute into the song, etc. The media scroll-line may, in other embodiments, not represent time and may represent the media content in another way. For example, a media scroll-line may be used to scroll through a series of discrete images/content which are not ordered in time and which themselves have no inherent associated time duration. The media scroll-line may in this case, for example, indicate one delineation per discrete image. This latter embodiment will be discussed after the embodiments relating to a media scroll-line which is a media timeline.

Figure 1:
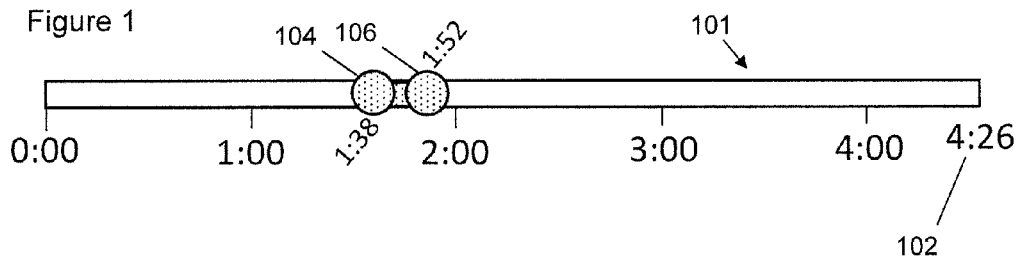
FIG. 1 illustrates a media scroll-line with a selection segment.

A song segment may be selected by positioning a start marker and an end marker along a song timeline representing the length of the song. FIG. 1 illustrates an example song/media timeline 101 for a song which is 4 minutes 26 seconds long as shown by the end time marker 102. The start marker 104 has been placed 1 minute 38 seconds into the song, and the end marker 106 has been placed 1 minute 52 seconds into the song, creating a 14 second "clip"/segment of the song.

The media timeline 101 may be displayed on a portable electronic device in different ways. The entire media timeline from 0:00 to 4:26 may be displayed on screen at the same time; this may be considered a "full view". Given the relatively small screen of a portable electronic device (which may be about 4 inches in length, for example), the resolution of the media timeline 101 will be relatively coarse. It may not be possible, or at least may be very tricky, to indicate particular time points 104, 106 along the media timeline 101 with a satisfactory degree of accuracy when the media timeline 101 is displayed in this way on the portable electronic device. For example, when the entire media timeline 101 for a song 4:26 minutes long is displayed on a 4.3 inch display, the user may be able to select a time point along the media timeline to an accuracy of ±20 seconds. That is, a point may be selected on the media timeline but the user cannot place the point more accurately that ±20 seconds of the desired location on the timeline. If the user wishes to place start and end points on the media timeline which are, for example, 14 seconds apart as shown in FIG. 1, this is not possible.

The length of the 4:26 timeline is too long to all be displayed on the screen of the portable electronic device and provide the user the possibility to selects points along the timeline with the required accuracy. Therefore, a "zoomed in" view of the media timeline may be possible to provide a zoomed in section of the media timeline 101 on the display. The start point of the timeline, at 0:00, and/or the end of the timeline at 4:26, will not be displayed at the same time in the "zoomed in" view. For example, the portion of the timeline 101 from 0 to 30 seconds may be displayed on the screen of the portable electronic device.

In the "zoomed in" view, the user may be able to initially place the start and end points more accurately than in the "full view". However, if the user wishes to move a start and/or an end point marker to a region of the media timeline which is not currently displayed, the user is required to either use zoom functionality, or scroll the start/end markers along the media timeline.

The user may be able to zoom out of the current "zoomed in" view and zoom back in to a different region where he wishes to re-position the start/end marker. In this case the marker which is not being moved will be off-display in the new zoomed-in view. The user will lose the spacing between the two markers and will not be able to see both markers. To go back and re-view the marker which has not moved, the user must zoom back out and re-zoom in on the marker which has not moved. Further, if the user wishes to re-position a marker then he may need to first remove the marker, before zooming in on a different portion of the media timeline and re-placing the marker. Thus the earlier position of the marker is lost. The user may be able to use different zoom levels to gradually "home in" on the point on the timeline which he wishes to mark. This requires extensive use of zoom controls, and may be time consuming and fiddly.

The user may be able to scroll to move the start/end point along the media timeline. In doing this both the start/end point being moved and the media timeline will scroll along the display of the portable electronic device so that a different part of the media timeline is displayed. The marker which is not being re-positioned will no longer be displayed as it scrolls off the edge of the display. Further, the spacing between the start and end points is lost as one marker is moved along the timeline. To go back and re-view the marker which has not moved, the user must scroll back along the timeline. The scrolling back and forth to check and move the two markers may also be time consuming and fiddly. If the user wishes to re-position a marker to a new place on the media timeline and the separation between the old and new marker positions is larger than a screen width (that is, the old and new marker positions on the media timeline are so far apart than both the old and new positions cannot be viewed together on the same screen) then the user must first remove the marker, scroll to the new position, and re-place the marker. This means that the old marker position is lost.

An object of one or more embodiments of the present disclosure is to allow a user to accurately and easily define start and end points on a media timeline without the requirement to use a zoom function. A further object of one or more embodiments of the present disclosure is to provide a user of a portable electronic device with a simple and efficient user interface for selecting a portion of a media timeline. A further object of one or more embodiments of the present disclosure is to allow the user to move the media timeline without moving start and end markers, to effectively slide the media timeline relative to the markers in order to reposition the markers on the timeline in a simple way while important information (e.g. start and end points, general position on the media timeline) is continuously presented to the user during the positioning and re-positioning of the start and end markers.

Figure 2:
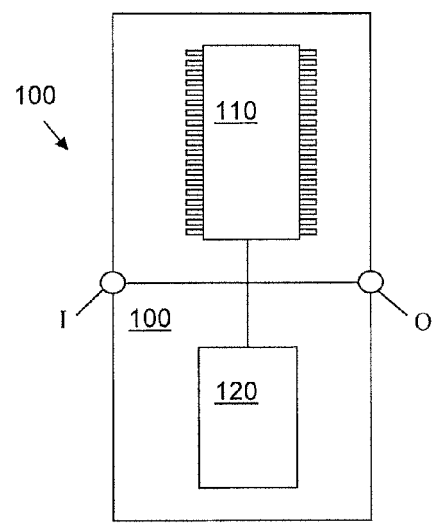
FIG. 2 illustrates an example apparatus according to the present disclosure.

FIG. 2 shows an apparatus 100 comprising a processor 110, memory 120, input I and output O. In this example only one processor and one memory are shown but it will be appreciated that other examples may use more than one processor and/or more than one memory (for example, the same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling (for example, by wired or wireless means e.g., Bluetooth or over a WLAN) to the apparatus 100 from further components. The output O allows for onward provision of signalling from the apparatus 100 to further components. In this example the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other examples one or more or all of the components may be located separately (for example, throughout a portable electronic device such as devices 200, 300, 500, 600, 700) or through a "cloud", and/or may provide/support other functionality.

Figure 3:
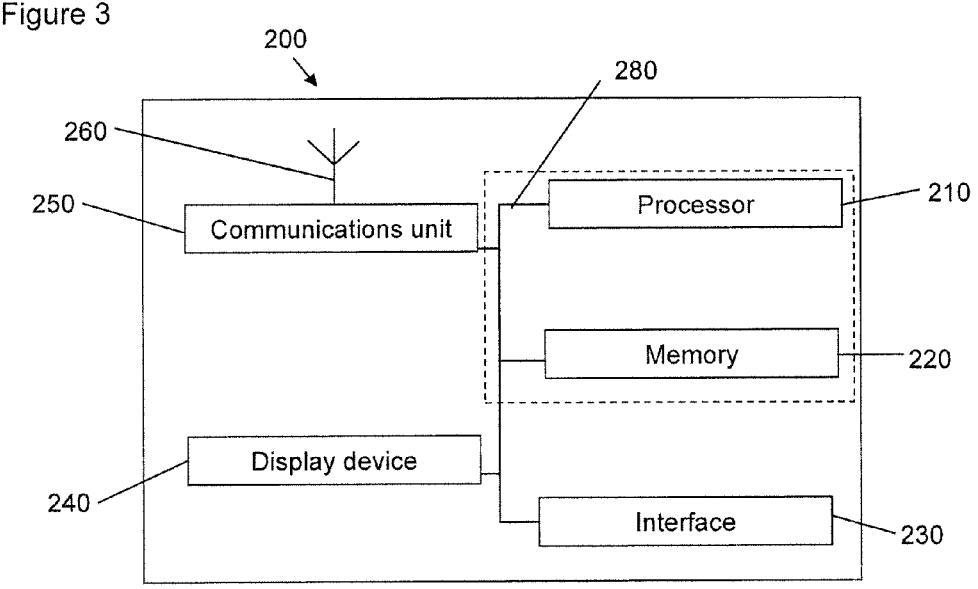
FIG. 3 illustrates another example apparatus according to the present disclosure.

One or more examples of the apparatus 100 can be used as a component for another apparatus as in FIG. 3, which shows a variation of apparatus 100 incorporating the functionality of apparatus 100 over separate components. In other examples the device 200 may comprise apparatus 100 as a module (shown by the optional dashed line box) for a mobile phone, PDA or audio/video player or the like. Such a module, apparatus or device may just comprise a suitably configured memory and processor.

The example apparatus/device 200 comprises a display 240 such as a Liquid Crystal Display (LCD), e-Ink, or (capacitive) touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. The user interface 230 may comprise one or more input units, such as, for example, a physical and/or virtual button, a touch-sensitive panel, a capacitive touch-sensitive panel, and/or one or more sensors such as infra-red sensors or surface acoustic wave sensors. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network (for example, to transmit a determined geographical location) and/or a port (not shown) for accepting a physical connection to a network, such that data may be received (for example, from a white space access server) via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 4:
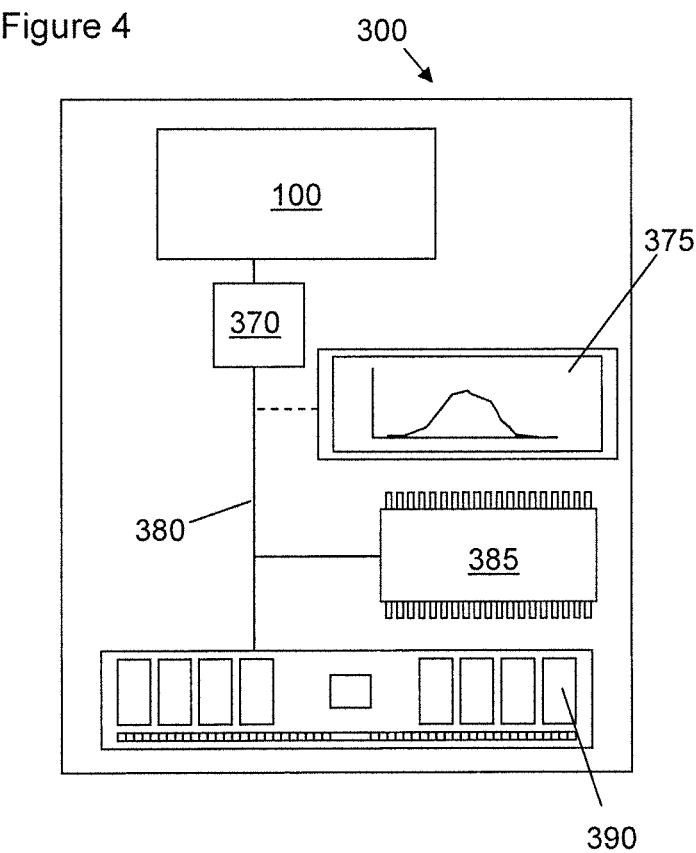
FIG. 4 illustrates another example apparatus according to the present disclosure.

FIG. 4 shows a device/apparatus 300 which may be an electronic device, a portable electronic device, a portable telecommunications device, or a module for such a device (such as a mobile telephone, smartphone, PDA or tablet computer). The apparatus 100 may be provided as a module for a device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 385 to access the computer program code.

The apparatus 100 in FIG. 4 is electrically connected to an input/output interface 370 that receives the output from the apparatus 100 and transmits this to the device 300 via a data bus 380. The interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

FIGS. 5a-5d illustrates an example of the apparatus/device 500 in use. A smartphone portable electronic device 500 is shown in this example with a touch-sensitive display 502 which is 4" in width and 4.5" in length. The device 500 is displaying a title and cover of an album 504 as a background image. Over the background image 504 is displayed a partial portion of a media timeline 506. The song related to the media timeline is over 4 minutes long, and the partial portion displayed is the start portion from the beginning of the song to about 40 seconds into the song.

The user wishes to select a segment of the partial portion 506, and save it for use as a particular contact ringtone so that, when that particular contact calls the user on the smartphone 500, the ringtone played is the user's selected segment of the song 504. The user has initially selected a segment of the song by placing a start marker 508 at 0:05 seconds 510, and an end marker 512 at 0:25 seconds 514. The user selection has been made by the user touching the partial portion of the media timeline 506 at the displayed marked start and end points 506, 512. The start and end markers 508, 512 together define a selection segment 516 of the song. The selection segment in this example is 20 seconds long.

The user is able to playback the selection segment 516 of the song associated with the selection segment 516, to check if they are happy with the selected segment. This may be done by selecting the "play" icon 518. If the user is happy with their selection they can store/save the media content associated with the selection segment 516 as a new media file (such as a ringtone file) by selecting the "save" icon 520. In this example, the user is not happy with the current selection segment position and wishes to reposition the start and end markers 508, 512 to points later in the song.

Figure 5A:
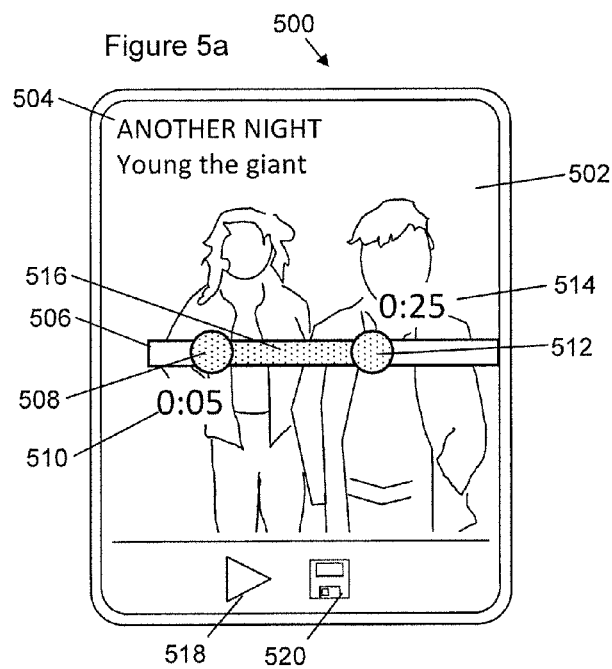
FIGS. 5a-5d illustrate user scrolling input to scroll a media scroll-line relative to a selection segment displayed on a portable electronic device, and moving the end point of the selection segment.
Figure 5B:
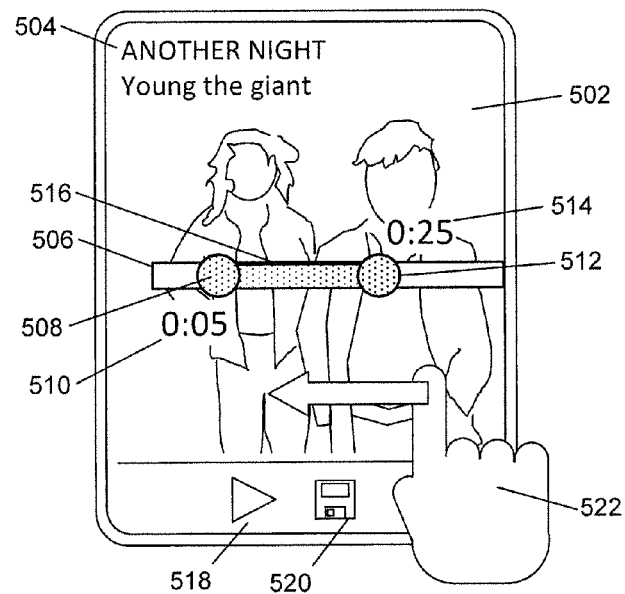

In FIG. 5b, the user performs a user scrolling input 522 and slides a finger across the display 502 from right to left in a background region of the display. This input has the effect of scrolling the media timeline itself on the display 502 relative to the selection segment 516. In this example, the position of the selection segment 516 on the display 516 stays the same whilst the user scrolling input 522 scrolls the media timeline on the display 502. This input could, in other examples, be applied to the media timeline itself by the user touching and dragging a finger along the media scroll-line away from the start and end markers (to avoid re-positioning of the markers). Of course, after a positive confirmation of a selection segment, the movement of the markers may be disabled such that user input applied to the media timeline, whether away from or over one or more of the markers moves/scrolls the media timeline itself without moving the selected marker positions.

Figure 5C:
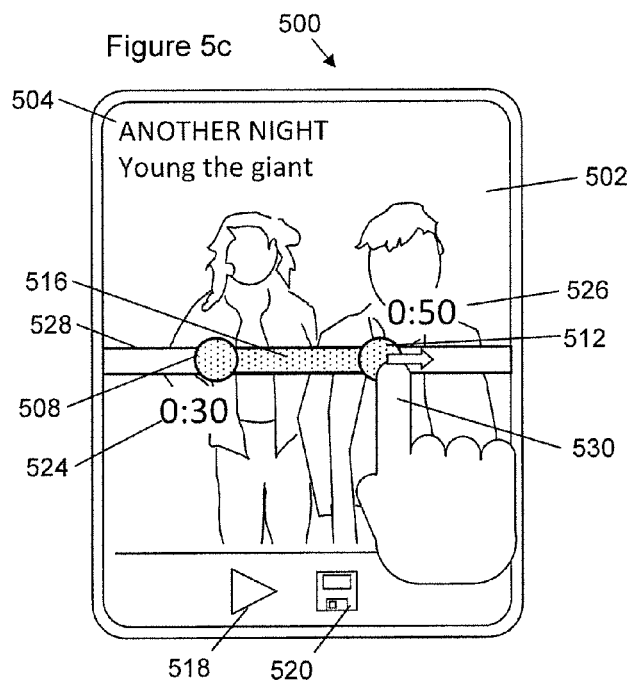

FIG. 5c shows the results of the user scrolling input 522. This re-positions the selection segment 516 to a different partial portion 528 of the media timeline so that the selection segment 516 is re-positioned with respect to the media timeline. The start of the media timeline at 0:00 seconds is not displayed any longer and is off the left side of the display 502. The end of the media timeline is still not shown, as it is off the right side of the display 502. The start marker 508 is now at a position 0:30 seconds 524 into the song, and the end marker 512 is at a position 0:50 seconds 526 into the song. The selection segment is still 20 seconds long. The user is able to playback the new selection segment 516 of the song to decide if they are happy with the new segment of the song they have selected.

Thus the user is able to scroll the media timeline while the selection segment 516 defined by the start and end markers 508, 512 remains in the same place on the display 502 (the position of the selection segment on the display remains fixed relative to the display). The user does not have to zoom in or out of the display in order to reposition the markers to points on the media timeline which were not previously displayed. For example, the point 0:50 seconds into the song 526 on the media timeline was not displayed in FIGS. 5a and 5b before the user scrolling input 522. Further, even though the media timeline is shown on a relatively zoomed-in scale, allowing for accurate (re-)positioning of the start and end markers, the user is still able to display a different partial portion 528 of the media timeline whilst retaining both the separation of the start and end markers 508, 512 and, throughout the scroll process, both markers remain displayed.

FIG. 5c shows that the apparatus is configured such that the re-positioned selection segment 516 is no longer associated with the particular time segment 510, 514 of the media content as marked by the position of the start and end points 508, 512 of the selection segment 516 prior to user scrolling. The selection segment prior to scrolling was between 0:05 and 0:25 seconds, and after scrolling the selection segment is at the non-overlapping time region of 0:30 to 0:50 seconds.

In other examples, the apparatus may be configured such that one of the start and end points of the different partial portion is positioned to be within, on, or adjacent to the particular selection segment of the media content as marked by the position of the start and end points of the selection segment prior to user scrolling. For example, a 15 second partial portion may be moved from 0:05 to 0:20 seconds to 0:20 to 0:35 seconds. The new start point at 0:20 seconds is located on the previous end point which was at 0:20 seconds. As another example, a partial portion may be moved from 0:05 to 0:20 seconds to 0:15 to 0:30 seconds. The new start point at 0:15 seconds is within the previous selection segment of between 0:05 to 0:20 seconds, and the new end point at 0:30 seconds is adjacent the previous end point which was at 0:20 seconds.

The user decides that they are happy with the start point of the selection segment but they would like the end point to be positioned later. FIG. 5c shows the user making a "move marker" input 530 to drag the end marker 512 to a point later in the song. Since the media timeline is displayed on a relatively zoomed-in scale such that a partial portion 506 is displayed, the user is able to position and re-position the end marker 512 (and the start marker 508 if they choose) to a new position on the media timeline with an acceptable accuracy (for example, to within ±0.5 seconds).

Figure 5D:
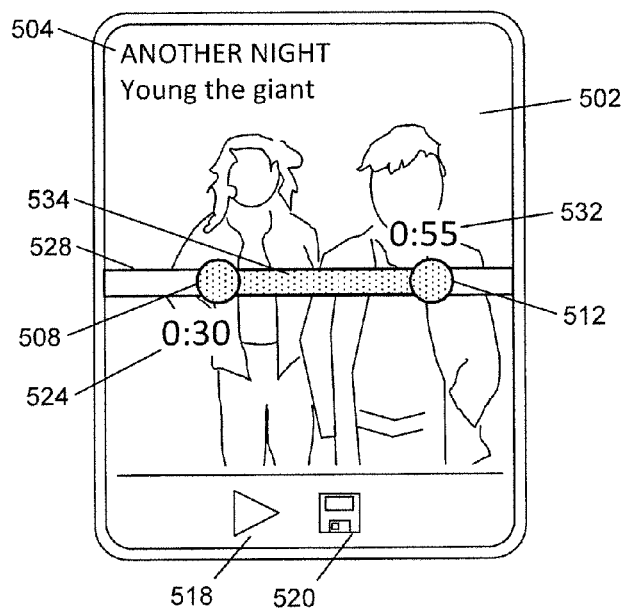

In FIG. 5d, the user has moved the end marker 512 to a position 0:55 seconds 532 into the song, to make a 25 second song selection segment. Thus FIG. 5d illustrates that the apparatus is configured such that the end point 512 (and/or the start point 508 if desired) on the media timeline may be re-positioned by the user 530 to vary the particular time duration of the selection segment 516, 534 by interaction with the end point 512 (and start point 508 if desired). This may be done at the outset if the user decides that the selection segment needs adjusting prior to moving the media timeline.

The user can playback 518 the selection segment 534 of the song. In this example the user decides they are happy with the selection segment 534 they have marked. The user can then select the "save clip" icon 520 to store the selected segment 534 of the song as a new media file. The new media file may be used as a ringtone, for example. The user may be presented with, for example, a menu or option of providing a filename, choosing a storage location for the new clip, sending the clip to a contact, allocating the clip to a contact or particular action, and/or other options known in the art.

The selection segment 516, 534 is a fraction of the partial portion 506, 528, and the partial portion itself 506, 528 is a partial fraction of the entire media timeline. The selection segment 516 may be marked by the user, if they wish, to be the size of the entire partial portion 506 displayed on the display 502 of the device 500, by placing the start marker 508 at the far left side of the display 502 and placing the right marker 512 at the far right of the display 512.

The apparatus may be configured such that the (e.g., maximum or minimum) size of the selection segment which can be selected is controlled to be associated with a (maximum or minimum) size of an associated media file. For example, a user may wish to store a segment so of a song as a ringtone, or attach a segment of a movie to an MMS message. The ringtone file (the associated media file) may be created up to a maximum file size for use as a ringtone. The size may be specified in units of time (for example, a selection segment as a ringtone may not be longer than 30 seconds), and/or may be specified in units of storage (for example, a movie segment selected for attachment to an e-mail may not be larger than 10 Mb). Other file size factors may be taken into account, such as the resolution of an audio/video file, a particular file compression method, a display size on screen, or other factors.

The media timeline in this example represents a song. In other examples, the media timeline could represent an album (a series of songs/tracks), a movie, a series of movies, or a series of still images/photographs which may be displayed sequentially.

Generally, the partial portion 506, 528 of the song displayed on the display 502 represents a fraction of the entire media timeline. The partial portion in the example of FIGS. 5a-5d is substantially 15% of the duration of the whole media content (a 40 second portion of a 4 minute 30 second song). In other examples, the partial portion may represent up to one of substantially 95%, 90%, 85%, 80%, 75%, 70%, 65%, 60%, 55%, 50%, 45%, 40%, 35%, 30%, 25%, 20%, 10%, 5%, or 1% of the duration of the whole of the media content. For example, a 12 second partial portion of a short movie (a 15 second home movie) is a substantially 80% fraction of the total duration of the movie. A 2 minute partial portion of a movie which is 3 hours long is substantially a 1% fraction of the movie.

Generally the selection segment 516, 534 represents a fraction of the partial portion. In the examples of FIGS. 5a-5d, the selection segment 516, 534 represents substantially 50% or 65% of the partial portion (20 seconds or 25 seconds of a 40 second partial portion), which is substantially 7% or 10% of the duration of the whole media content (20 s seconds or 25 seconds of a 4:30 second song). In other examples, the selection segment may represent up to one of substantially 95%, 90%, 85%, 80%, 75%, 70%, 65%, 60%, 55%, 50%, 45%, 40%, 35%, 30%, 25%, 20%, 15%, 10%, 5%, or 1% of the duration of the partial portion or the duration of the whole of the media content.

In the examples of FIGS. 5a-5d, the display is 4 inches in width and the media timeline is displayed along the width of the display 502. In other examples, the dimension of the display along the axis of the media timeline (which may be along the width or the length, for example) may be up to one of substantially 12, 11.5, 11, 10.5, 10, 9.5, 9, 8.5, 8, 7.5, 7, 6.5, 6, 5.5, 5, 4.5, 4, 3.5, 3, 2.5, 2, 1.5, or 1 inches in length. For example, a tablet computer may have a display which is about 7 to 10 inches in length, where as a mobile phone or other media player may have a display which is about 1 to 4 inches in length.

The start and end points of the selection segment in FIGS. 5a-5d are about 2 inches or about 2.5 inches apart on the media timeline (20 s or 25 s of a 40 s partial portion displayed on a 4 inch wide display 502). In other examples the start and end points of the selection segment may be up to one of substantially 11, 10.5, 10, 9.5, 9, 8.5, 8, 7.5, 7, 6.5, 6, 5.5, 5, 4.5, 4, 3.5, 3, 2.5, 2, 1.5, 1, 0.5 or 0.25 inches in length apart.

The media timeline in FIGS. 5a-5d is substantially 27 inches long (15% of the entire media timeline is displayed as a partial portion on a 4 inch wide display). The media timeline in other examples may be up to one of substantially 100, 80, 60, 50, 40, 30, 20, 15, 11, 10.5, 10, 9.5, 9, 8.5, 8, 7.5, 7, 6.5, 6, 5.5, 5, 4.5, 4, 3.5, 3, 2.5, 2, 1.5, or 1 inches, or over 100 inches, in length if fully shown on a display. For example, a feature length movie will have a relatively long media timeline whereas a short song will have a relatively short media timeline.

As well as the media timeline being used to indicate the positions in a song as in FIGS. 5a-5d, the media timeline may be used to control the playing of the media content. This may be done by allowing for user input to the media timeline itself, or by merely allowing for marking of the start and/or end points or by giving a visual indication of the play position within an item of media content. For example, as described above, input to the media timeline can be used to scroll through the media content. The media timeline may in other examples be used to play the media content (for example, by tapping the media timeline) and pause the media content (for example, by tapping the media timeline while the media content is playing). The media timeline may be used to cut out a section of the media content, and paste to the media content. For example, a 0:00 second to 0:15 second portion of a 1 minute song may be cut from the start of the song and pasted at the end of the song using the media timeline.

In some examples, the apparatus may be configured such that if the media associated with the media scroll-line is being played/outputted, a user scrolling input may be made (to the media scroll-line or to the background) to scroll the media scroll-line. In such a case, the movement of the start marker with respect to the media scroll-line may cause the media being played/outputted to re-start playing/being output from the new position of the start marker with respect to the media scroll-line. Similarly, a user input may be made to move the start (or end) marker while the media associated with the media scroll-line is playing/being output. The movement of the start marker with respect to the media scroll-line may therefore cause the media being played/outputted to re-start playing from the new position of the start marker with respect to the media scroll-line.

In this way the media automatically re-starts playing/being output from the newly selected start position on the media scroll-line. The automatic re-playing of the media content associated with the moved selection segment may be advantageous for a user trying to select a particular clip from a media item. Since the user is able to easily re-position the selection segment on the media scroll-line (by moving the media scroll-line relative to a selection segment), and the user is not required to re-select a "play" option to review/listen to the media content associated with the re-positioned selection segment, the user may find that selecting and listening to a re-positioned selection segment is quick, convenient, and requires minimal user interaction.

As stated above, the media content associated with the media timeline may comprise audio and/or video media content. Furthermore, the media timeline may be represented in different ways, as shown in FIGS. 6a-6c.

Figure 6A:
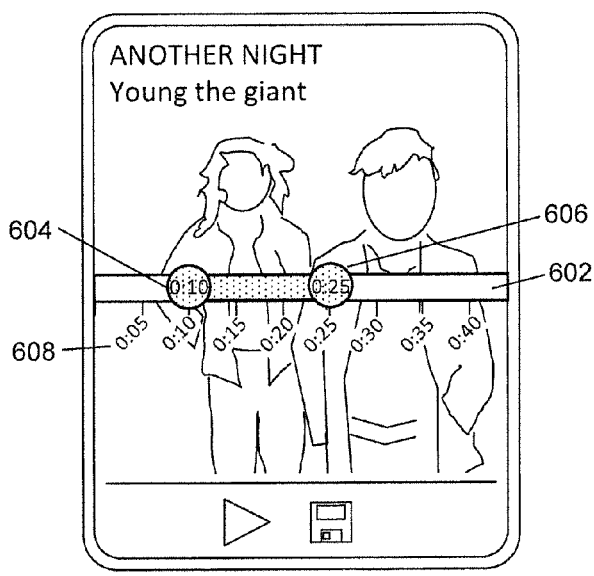

FIG. 6a shows a portable electronic device 600 displaying a media timeline for a song where the partial portion 602 is represented by a bar with 5 second time increments marked 608. The start marker 604 and end marker 606 each show the time in seconds between the start of the song and the marker position in numerals (0:10 and 0:25).

Figure 6B:
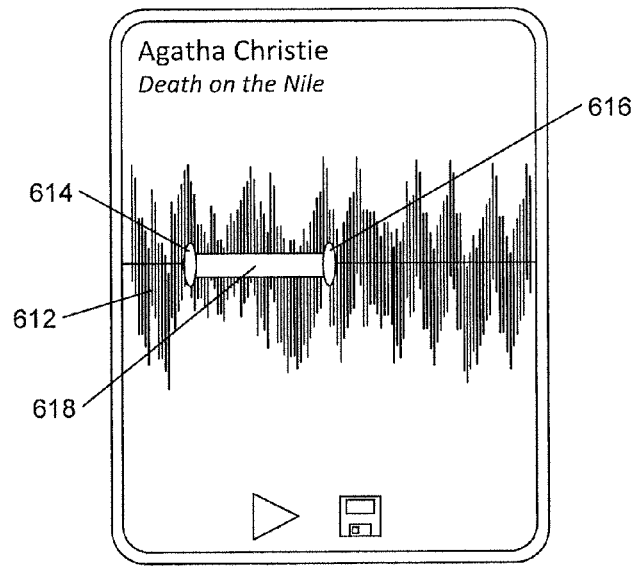

FIG. 6b shows a portable electronic device 600 displaying a media timeline for an audio track (in this example an audio book). The partial portion of the media timeline is shown as a waveform 612 representative of the associated audio media. The start and end markers 614, 616 of the selection segment 618 are displayed on the waveform.

FIG. 6c shows a portable electronic device 600 displaying a media timeline for a movie (in this example of a ball rolling down a hill). The date of recording and the file name 620 "22 Sept 2011—ball.avi" are shown. The partial portion 624 of the media timeline is displayed with a start marker 626 at 1 minute 25 seconds 628 into the movie, and an end marker 630 at 1 minute 58 seconds 632 into the movie. The start and end markers 626, 628 define a selection segment 650 of the movie. Also displayed in this example are thumbnail images representing frames of the movie at regular points along the partial portion 602. Thus at about 1 minute 30 seconds a frame 634 is shown with the ball at the top of the hill, at 2 minutes a frame 636 is shown with the ball part-way down the hill, and at 2 minutes 30 seconds a frame 638 is shown with the ball at the bottom of the hill. The display of such frames may provide a visual cue to help the user identify roughly the start and end points of the selection segment 650 they wish to mark (for example, to allow control of playing of the associated media content). The user may select a playback option 640 in order to preview the movie clip (the selection segment of the media timeline corresponding to a section of the movie content). The user can save the clip by selecting the save option 642 once he/she is happy with the selection segment.

FIGS. 7a and 7b illustrate an example of the effect of a user scrolling input made on a desktop computer 700 with a keyboard 703 and mouse (not shown). The user is watching a video which they recorded on a trip to London on 13 Dec. 2010, as indicated on the display 702. The user is able to preview the media content on the preview display area 704, for example by selecting the play/preview icon 722. The media content available for preview may include the entire media content, the media content corresponding to the displayed partial portion 710 and/or the media content associated with the selection segment 712. The selection segment 712 is indicated by user marked start and end points 714, 716. In FIG. 7a the partial portion 710 includes the start of the media content. In this example the preview display area 704 is displaying a still from the video of the trip to London at the position in the movie indicated by the start marker 714 on the media timeline 710 corresponding to the movie content.

In FIG. 7b, the user has performed a scroll input using a mouse (not shown), for example, to move/drag the media timeline itself to the left and display a different partial portion 718 of the media timeline. The partial portion 712 is later in time in the media content than the partial portion 710 shown in FIG. 7a due to the movement of the media timeline relative to the selection segment 712. In this example, not only has the media timeline itself moved from right to left on the display compared with the start and end marks 714, 716 and the selection segment 712, but the preview display area 706 in FIG. 7b is also showing a different scene from the relative later placement of the start marker 714 on the media timeline. Once the user is happy with their movie clip selection, they may save it as a new media file using the save icon 724.

Therefore a user scrolling input may scroll the media timeline itself and change the way in which other elements are displayed. This may give a desirable visual effect for the user and help to provide a visual prompt that the user's scrolling input is recognised and performing a corresponding scrolling motion across the display. In other examples, the movement of the media timeline may be shown as well as a movement of/pan across a background image across the display (for example, an album cover may be displayed in the background of a media timeline representing a song or songs of that album). The media timeline movement may appear to be greater than the corresponding movement of the background image for a given user scrolling input, for example, to provide a visual effect.

In some examples, the apparatus may be configured such that the user scrolling input scrolls both the media timeline and the selection segment (and start and end markers) as long as one of the marked start or end points of the selection segment has not reached an edge of the display. When one end of the selection segment reaches the edge of the display (in the sense as shown in the example of FIG. 7b, wherein the start marker 714 reaches the left hand side of the display), the position of the selection segment on the display may remain stationary at that edge of the display while the media timeline continues to scroll with respect to the stationary selection segment for the remainder of the user scroll input.

For example, prior to a user scroll input, the start marker may be located away from an edge of the display. When the user scroll input is performed from right to left, both the media timeline and the selection segment may move to the left on the display (by the same, or different, amounts) until the start marker (the left-most point of the selection segment) reaches the left side of the display. At that point the selection segment remains displayed and stationary on the display while the user continues to perform the scroll input from right to left and the media timeline continues to move from right to left with respect to the selection segment. The same effect may be obtained for a user scrolling from left to right and an end marker of the selection segment reaches the right side of the display. This effect may again provide a visual prompt for the user to see that they are scrolling across the display.

While the above examples relate to a media timeline corresponding to a single media file (a song or a movie), in other examples the media content may associated with a plurality of discrete media files. For example, a media timeline may be displayed to show an album of songs, and a user may be able to scroll through the album of songs to select a selection segment of one song of the album, or a selection segment overlapping two or more songs on the album. As another example, a user may be able to select a segment of a media scroll-line corresponding to a series of images, such as photographs in a photo album. Each image may be allocated an allotted "display time", for example five seconds, and the user may be able to select a selection segment of this media timeline, for example to prepare a presentation of images selected from a larger image collection.

In other examples the photographs may have no associated "time" with respect to one another and may each be shown as a discrete item along the media scroll-line (or represented in another way to allow scrolling of the items via user scrolling input for the media scroll-line). Each image in the series may be considered to correspond to a selection segment (or sub-set) in certain embodiments, so that a user can select one image from the series of images. Thus, the media scroll-line can be used to scroll through a plurality of discrete media files associated with the media scroll-line wherein the plurality of media files are not ordered with respect to each other in time, but by some other categorisation, for example. They could form a playlist of rock songs, with the media scroll-line allowing a user to readily scroll through the rock songs (as opposed to another type of song such as pop or country songs) to select one or more of those rock songs from the playlist/compilation. In such a case, one song may be considered to relate to a single delineation of the media scroll-line, e.g., one incremental movement of the media scroll-line may increment the content by one item (one rock song). In another example, the media scroll-line may scroll through a plurality of images categorised as favourite images. In a further example still, the media scroll-line could be used to scroll through all the media content, whether or not the content has been categorised, e.g., the scroll line may be configured to allow for scrolling through all the media content associated with the device/apparatus.

While the above examples illustrate a device receiving user input for user marking and user scrolling via a user touching a touch-sensitive screen, the user input may in other examples be made by a peripheral device. For example, a user may use a mouse or trackball to position a pointer on screen and make user inputs using the pointer, for example as shown on a display of a desktop computer.

The apparatus, configured to display a partial portion of a media timeline on a display, and allow user marking input allow user scrolling input, may be a portable electronic device or the display itself (either a stand-alone display, the display of a portable electronic device, or the display of a desktop computer). The apparatus may in other examples be a mobile telephone, a smartphone, a tablet computer, an audio player, a video player, a desktop computer, a television, a user interface or a module for the same. A portable electronic device may be a mobile telephone, a smartphone, an audio player, a tablet computer, or a video player.

FIG. 8a illustrates an example embodiment of an apparatus according to the present disclosure in communication with a remote server. FIG. 8b shows that an example embodiment of an apparatus according to the present disclosure in communication with a "cloud" for cloud computing. In FIGS. 8a and 8b, an apparatus 800 (which may be the apparatus 100, 200, 300, or an electronic device, 500, 600, 700, which is, or comprises, the apparatus) is in communication 808 with, or may be in communication 808 with, another device 802. For example, an apparatus 800 may be communication with another element of an electronic device such as a display screen, memory, processor, keyboard, mouse or a touch-screen input panel. The apparatus 800 is also shown in communication with 806 a remote computing element 804, 810.

FIG. 8a shows the remote computing element to be a remote server 804, with which the apparatus may be in wired or wireless communication (e.g., via the internet, Bluetooth, a USB connection, or any other suitable connection). In FIG. 8b, the apparatus 800 is in communication with a remote cloud 810 (which may, for example, by the Internet, or a system of remote computers configured for cloud computing).

The apparatus 800 may be able to obtain/download software or an application from a remote server 804 or cloud 810 to allow the apparatus 800 to perform as described in the examples above. The media content and/or any saved new media files (saved from selection segments of media timelines), for example, may be stored remotely on a server 804 or a remote cloud 810.

FIG. 9 shows a flow diagram illustrating the steps of
  displaying a partial portion of a media scroll-line on a display;
  allowing user marking input of respective start and end points to the partial portion of the media scroll-line, the marked start point and end point together defining a selection segment of the partial portion 902; and
  allowing user scrolling input to the media scroll-line to scroll the media timeline on the display relative to the selection segment to re-position the selection segment to a different partial portion of the media scroll-line to allow for selection of the re-positioned selection segment 904.

FIG. 10 illustrates schematically a computer/processor readable medium 1000 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g., switched on. In such cases, the apparatus/device/server may not necessarily have the appropriate software loaded into the active memory in the non-enabled state (for example, a switched off state) and may only load the appropriate software in the enabled state (for example, an "on" state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, wherein the appropriate software can be enabled for use by a user downloading a "key", for example, to unlock/enable the software and its associated functionality. Advantages associated with such examples can include a reduced requirement to download data when further functionality is required for a device, can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (such as, memory or a signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one or more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (such as ROM, or CD-ROM), these may comprise a computer processor, application specific integrated circuit (ASIC), field-programmable gate array (FPGA), and/or other hardware components that have been programmed in such a way to carry out the inventive function(s).

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures, elements and/or method steps shown and/or described in connection with any disclosed form or examples may be incorporated in any other disclosed or described or suggested form or example as a general matter of design choice. Furthermore means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   cause display of a partial portion of a media scroll-line on a display;
   allow user marking input of respective start and end points to the partial portion of the media scroll-line, the marked start point and end point together defining a selection segment of the partial portion;
   allow user scrolling input to scroll both the selection segment and the media scroll-line such that the media scroll-line is moved across and repositioned relative to the display, wherein the media scroll-line is scrolled, in response to the user scrolling input, relative to the selection segment to re-position the selection segment to a different partial portion of the media scroll-line that had not been displayed on the display to allow for selection of the re-positioned selection segment, and so as to newly display the different partial portion of the media scroll-line on the display independent of the selection segment in response to the user scrolling input; and
   in an instance when one of the marked start point or end point reaches an edge of the display, the apparatus is configured to cause the position of the selection segment on the display to remain fixed relative to the display whilst a remainder of the media scroll-line on the display is scrolled in response to the user scrolling input.

2. The apparatus of claim 1, wherein the apparatus is configured such that the user scrolling input to the media scroll-line is to the media scroll-line itself or to a background of the media scroll-line, the user scrolling input allowing for scrolling of the media scroll-line on the display relative to the selection segment to re-position the selection segment to a different partial portion of the media scroll-line to allow for selection of the re-positioned selection segment.

3. The apparatus of claim 1, wherein the apparatus is configured such that the media scroll-line is a media timeline, the media timeline for use in controlling the playing of the media content associated with the media timeline.

4. The apparatus of claim 1, wherein the apparatus is configured such that user marking input of respective start and end points on the media scroll-line and the user scrolling input to scroll the media scroll-line on the display relative to the selection segment are performed at the same display zoom level.

5. The apparatus of claim 1, wherein the apparatus is configured such that the segment of media content associated with the selection segment is small compared to the media content or partial portion of the media content, such that it requires a refined level of manipulation resolution to allow for accurate user selection which would not be available if the media scroll-line representing the whole media content was provided on the display.

6. The apparatus of claim 1, wherein:
   the partial portion represents up to one of substantially 95%, 90%, 85%, 80%, 75%, 70%, 65%, 60%, 55%, 50%, 45%, 40%, 35%, 30%, 25%, 20%, 15%, 10%, 5%, or 1% of the duration of the whole of the media content, and/or
   the selection segment represents up to one of substantially 95%, 90%, 85%, 80%, 75%, 70%, 65%, 60%, 55%, 50%, 45%, 40%, 35%, 30%, 25%, 20%, 15%, 10%, 5%, or 1% of the duration of the partial portion or the duration of the whole of the media content.

7. The apparatus of claim 1, wherein the apparatus is configured such that the media scroll-line is up to one of substantially 100, 80, 60, 50, 40, 30, 20, 15, 11, 10.5, 10, 9.5, 9, 8.5, 8, 7.5, 7, 6.5, 6, 5.5, 5, 4.5, 4, 3.5, 3, 2.5, 2, 1.5, or 1 inches in length if represented fully on the display.

8. The apparatus of claim 1, wherein the apparatus is configured such that the dimension of the display along the axis of the media scroll-line is up to one of substantially 12, 11.5, 11, 10.5, 10, 9.5, 9, 8.5, 8, 7.5, 7, 6.5, 6, 5.5, 5, 4.5, 4, 3.5, 3, 2.5, 2, 1.5, or 1inches in length.

9. The apparatus of claim 1, wherein the apparatus is configured such that the start and end points of the selection segment are up to one of substantially 11, 10.5, 10, 9.5, 9, 8.5, 8, 7.5, 7, 6.5, 6, 5.5, 5, 4.5, 4, 3.5, 3, 2.5, 2, 1.5, 1, 0.5 or 0.25 inches in length apart when shown on the display.

10. The apparatus of claim 1, wherein the apparatus is configured to allow storage of the media content associated with the selection segment as a new media file.

11. The apparatus of claim 10, wherein the new media file is useable as one or more of: a ringtone, an audio clip, or a movie clip.

12. The apparatus of claim 1, wherein the apparatus is configured to allow playback of the media content associated with the selection segment prior to storing the media content associated with the selection segment as a new media file.

13. The apparatus of claim 1, wherein the apparatus is configured such that the size of the selection segment which can be selected is controlled to be associated with a size of an associated media file which can be used to perform a function.

14. The apparatus of claim 1, wherein the apparatus is configured such that the media scroll-line is configured to control the playing of the media content by allowing for user input to one or more of the media scroll-line itself and to a background of the media scroll-line to perform one or more of: scroll through, play, pause, cut out and paste to the media content.

15. The apparatus of claim 1, wherein the apparatus is configured such that the start point and end point on the media scroll-line are re-positionable by the user with respect to the media scroll-line to vary the size of the selection segment by user interaction with the respective marked start and end points.

16. The apparatus of claim 1, wherein the media content associated with the media scroll-line comprises audio media content, video media content, a single discrete media file, a single movie, a single audio track, a single audio album, a single video album, a compilation for a plurality of discrete single images/movies/audio tracks, and/or a plurality of discrete media files.

17. The apparatus of claim 1, wherein the apparatus is: a portable electronic device, the display, the display of a portable electronic device, the display of a desktop computer, a desktop computer, a mobile telephone, a smartphone, a tablet computer, an audio player, a video player, a television, a user interface or a module for the same.

18. The apparatus of claim 1, wherein the apparatus is configured such that movement of the start point to a new position on the media scroll-line causes playback of the media content associated with the selection segment from the new position of the start point with respect to the media scroll-line.

19. A non-transitory computer readable medium comprising computer program code stored thereon, the computer readable medium and computer program code being configured to, when run on at least one processor, perform at least the following:
cause display of a partial portion of a media scroll-line on a display;
allow user marking input of respective start and end points to the partial portion of the media scroll-line, the marked start point and end point together defining a selection segment of the partial portion;
allow user scrolling input to scroll both the selection segment and the media scroll-line such that the media scroll-line is moved across and repositioned relative to the display, wherein the media scroll-line is scrolled, in response to the user scrolling input, relative to the selection segment to re-position the selection segment to a different partial portion of the media scroll-line that had not been displayed on the display to allow for selection of the re-positioned selection segment, and so as to newly display the different partial portion of the media scroll-line on the display independent of the selection segment in response to the user scrolling input; and
in an instance when one of the marked start point or end point reaches an edge of the display, cause the position of the selection segment on the display to remain fixed relative to the display whilst a remainder of the media scroll-line on the display is scrolled in response to the user scrolling input.

20. A method comprising:
causing display of a partial portion of a media scroll-line on a display;
allowing user marking input of respective start and end points to the partial portion of the media scroll-line, the marked start point and end point together defining a selection segment of the partial portion;
allowing user scrolling input to scroll both the selection segment and the media scroll-line such that the media scroll-line is moved across and repositioned relative to the display, wherein the media scroll-line is scrolled, in response to the user scrolling input, relative to the selection segment to re-position the selection segment to a different partial portion of the media scroll-line that had not been displayed on the display to allow for selection of the re-positioned selection segment, and so as to newly display the different partial portion of the media scroll-line on the display independent of the selection segment in response to the user scrolling input; and
in an instance when one of the marked start point or end point reaches an edge of the display, causing the position of the selection segment on the display to remain fixed relative to the display whilst a remainder of the media scroll-line on the display is scrolled in response to the user scrolling input.

* * * * *

UNITED STATES PATENT AND TRADEMARK OFFICE
CERTIFICATE OF CORRECTION

PATENT NO. : 9,684,441 B2
APPLICATION NO. : 13/657314
DATED : June 20, 2017
INVENTOR(S) : Moiseenko et al.

Page 1 of 1

It is certified that error appears in the above-identified patent and that said Letters Patent is hereby corrected as shown below:

In the Claims

Column 20,
Line 59, "1inches" should read --1 inches--.

Signed and Sealed this
Thirteenth Day of February, 2018

Andrei Iancu
*Director of the United States Patent and Trademark Office*